United States Patent
Hwang et al.

(10) Patent No.: US 10,461,303 B2
(45) Date of Patent: Oct. 29, 2019

(54) ELECTRODE STACK STRUCTURE AND BATTERY HAVING ELECTRODE STACK STRUCTURE

(71) Applicant: Samsung Electronics Co., Ltd., Suwon-si, Gyeonggi-do (KR)

(72) Inventors: Seungsik Hwang, Seongnam-si (KR); Dongjin Ham, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 389 days.

(21) Appl. No.: 15/205,037

(22) Filed: Jul. 8, 2016

(65) Prior Publication Data

US 2017/0077480 A1 Mar. 16, 2017

(30) Foreign Application Priority Data

Sep. 14, 2015 (KR) .......................... 10-2015-0129775

(51) Int. Cl.
*H01M 2/24* (2006.01)
*H01M 2/26* (2006.01)
*H01M 10/04* (2006.01)

(52) U.S. Cl.
CPC .............. *H01M 2/24* (2013.01); *H01M 2/26* (2013.01); *H01M 2/266* (2013.01); *H01M 10/0436* (2013.01); *H01M 2220/30* (2013.01)

(58) Field of Classification Search
CPC ............................................. H01M 2/20–348
See application file for complete search history.

(56) References Cited

U.S. PATENT DOCUMENTS

| | | | |
|---|---|---|---|
| RE36,102 E * | 2/1999 | Dougherty | H01M 2/24 429/160 |
| 5,880,925 A | 3/1999 | Dupré et al. | |
| 8,491,673 B2 | 7/2013 | Daidoji et al. | |
| 2004/0258986 A1 * | 12/2004 | Shen | H01M 2/266 429/161 |
| 2007/0231684 A1 | 10/2007 | Takano et al. | |
| 2010/0167123 A1 * | 7/2010 | Kim | H01M 2/021 429/211 |
| 2011/0200867 A1 | 8/2011 | Culver et al. | |
| 2013/0059183 A1 * | 3/2013 | Ahn | H01M 2/0217 429/94 |
| 2013/0143109 A1 | 6/2013 | Kim et al. | |
| 2013/0171485 A1 | 7/2013 | Kodera et al. | |

(Continued)

FOREIGN PATENT DOCUMENTS

| | | |
|---|---|---|
| JP | 2008066040 A | 3/2008 |
| JP | 2013-161674 A | 2/2012 |

(Continued)

OTHER PUBLICATIONS

Extended European Search Report for Application No. 16188608.0-1360 dated Nov. 30, 2016 (6 pages).

*Primary Examiner* — Jonathan G Leong
*Assistant Examiner* — Jacob Buchanan
(74) *Attorney, Agent, or Firm* — Cantor Colburn LLP

(57) ABSTRACT

An electrode stack structure including a plurality of stacked electrode layers including electrode layers having multiple tabs, wherein the multiple tabs include a first tab connected to a first lead; and a second tab that is spaced apart from the first tab, and wherein second tabs of electrode layers having a same polarity are electrically connected to each other.

10 Claims, 10 Drawing Sheets

(56) References Cited

U.S. PATENT DOCUMENTS

| | | |
|---|---|---|
| 2014/0317036 A1 | 12/2014 | Higuchi et al. |
| 2014/0356697 A1 | 12/2014 | Shin et al. |
| 2015/0044527 A1* | 2/2015 | Neudecker ............ H01M 2/204 429/61 |
| 2015/0056497 A1 | 2/2015 | Jo et al. |

FOREIGN PATENT DOCUMENTS

| | | |
|---|---|---|
| JP | 2014022116 A | 2/2014 |
| KR | 1020140015647 A | 2/2014 |

* cited by examiner

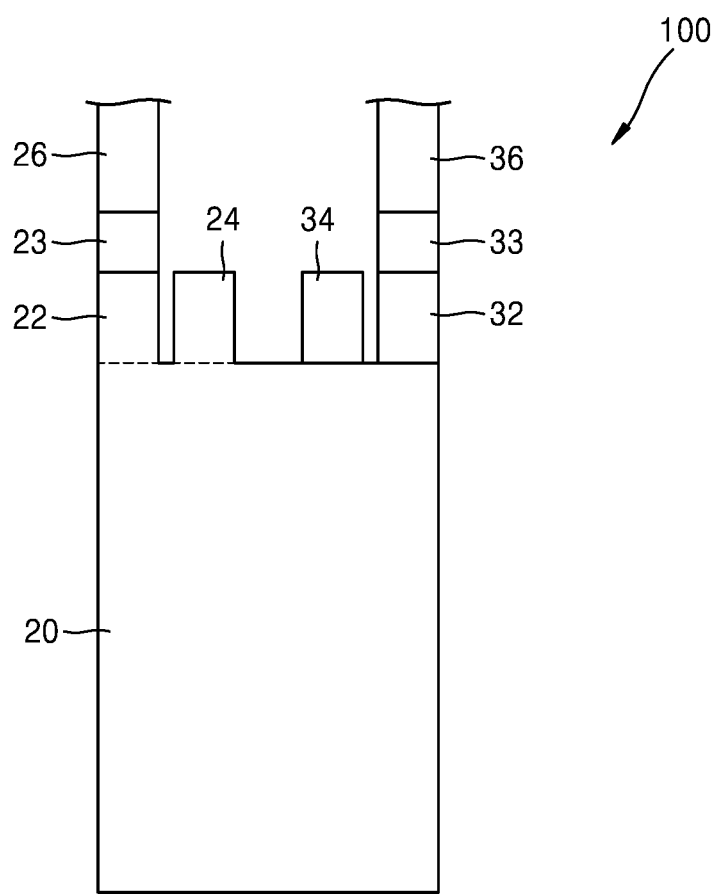

ELECTRODE STACK STRUCTURE AND BATTERY HAVING ELECTRODE STACK STRUCTURE

CROSS-REFERENCE TO RELATED APPLICATION

This application claims priority to and the benefit of Korean Patent Application No. 10-2015-0129775, filed on Sep. 14, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to an electrode stack structure and a battery.

2. Description of the Related Art

The development of markets for various mobile electronic devices, such as smart phones, smart pads, electronic book terminals, flexible tablet computers, mobile medical devices to be attached to the human body in addition to mobile phones, game devices, portable multimedia players (PMPs), and mpeg audio layer-3 (MP3) players have greatly increased.

As the markets related to the mobile electronic devices have grown, the need for a battery suitable for mobile electronic devices has increased. As mobile electronic devices have evolved, the need for flexibility of mobile electronic devices themselves has increased. In order to improve the flexibility of the mobile electronic devices, there is an increasing need for a flexible battery.

When a battery with insufficient flexibility is repeatedly bent or deformed by external forces, the electrode structure of the battery may also be deformed, and the battery may fail. Thus the remains a need for improved components for batteries.

SUMMARY

Disclosed is an electrode stack structure including electrode layers having multiple tabs and a battery including the electrode stack structure.

According to an aspect of an exemplary embodiment, an electrode stack structure comprises: a plurality of stacked electrode layers and including electrode layers having multiple tabs; wherein the multiple tabs each comprise a first tab and a second tab that is spaced apart from the first tab, wherein a first tab of a first multiple tab is connected to a first lead, and wherein second tabs of electrode layers having a same polarity are electrically connected to each other.

The electrode layers may comprise: a first electrode layer; a second electrode layer having different polarity than the first electrode layer and alternately disposed with the first electrode layer; and a separator disposed between the first electrode layer and the second electrode layer.

The first tab of the first electrode layer may be connected to a first lead and the first tab of the second electrode layer may be connected to a second lead. The second tabs formed on the first electrode layers may be electrically connected to each other. The second tabs formed on the second electrode layers may be electrically connected to each other.

The first tab may have a multi-fold shape.

Second tabs formed on the first electrode layer may be connected to each other by a first joining unit, and second tabs formed on the second electrode layers may be connected to each other by a second joining unit.

The first joining unit and/or the second joining unit may have a hinge unit including an electrically conductive material.

The electrode stack structure may further comprise a first electrode line that electrically connects the first lead with at least one second tab of the first electrode layer; and a second electrode line that electrically connects the second lead with at least one second tab of the second electrode layer.

The first electrode layer and/or the second electrode layer may include multiple tabs having a folded shape or a bent shape.

The first electrode layer and/or the second electrode layer may comprise multiple tabs having a multi-fold shape or a zigzag shape.

The electrode stack structure may further include a joining unit formed by overlapping the first tab and the lead.

The electrode layers may comprise a metal current collector and an active material layer disposed on at least a surface of the metal current collector, and the first tab and the second tab may be formed to protrude from the metal current collector.

The electrode layers may comprise a metal current collector and an active material layer disposed on at least a surface of the metal current collector, the first tab may protrude from the metal current collector, and the second tab may be disposed on a region of the metal current collector where the active material layer is not disposed.

According to an aspect of another exemplary embodiment, a battery includes the electrode stack structure.

Also disclosed is a method of manufacturing an electrode stack structure, the method including: stacking a plurality of electrode layers comprising electrode layers having multiple tabs, wherein the multiple tabs each comprise a first tab and a second tab which is spaced apart from the first tab; connecting a first tab of a first multiple tab to a lead; and connecting second tabs of electrode layers having a same polarity to each other to manufacture the electrode stack structure.

Additional aspects will be set forth in part in the description which follows and, in part, will be apparent from the description, or may be learned by practice of the presented exemplary embodiments.

BRIEF DESCRIPTION OF THE DRAWINGS

These and/or other aspects will become apparent and more readily appreciated from the following description of the exemplary embodiments, taken in conjunction with the accompanying drawings in which:

FIG. 4 is a schematic drawing of a battery having a tab connected to a lead;

DETAILED DESCRIPTION

Figure 1A:
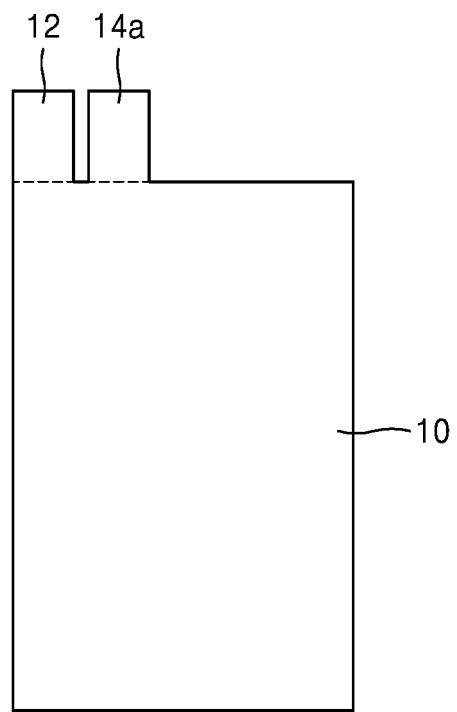
FIG. 1A is a schematic drawing of an electrode layer having multiple tabs.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present inventive concept.

It will be understood that when an element is referred to as being "on" or "adjacent to" another element, it can be directly on or adjacent to the other element or intervening elements may be present therebetween. In contrast, when an element is referred to as being "directly on" or "directly adjacent to" another element, there are no intervening elements present.

It will be understood that, although the terms "first," "second," "third," etc. may be used herein to describe various elements, components, regions, layers and/or sections, these elements, components, regions, layers, and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/ or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

An electrode stack structure having a multiple tabs according to an exemplary embodiment, and a battery that includes the electrode stack structure will be further disclosed with reference to accompanying drawings. In the drawings, thicknesses of layers and regions may be exaggerated for clarity.

As used herein the term "tab" refers to both a protrusion from the electrode layer and to a region of the electrode layer where electrode active material layer is not disposed on the electrode current collector as described in greater detail below, especially with reference to FIG. 1B.

FIG. 1A is a schematic drawing of electrode layer having multiple tabs, according to an exemplary embodiment.

Referring to FIG. 1A, a battery according to an exemplary embodiment may include at least one electrode layer 10 having multiple tabs, namely, a first tab 12 and a second tab 14a, each of which is disposed on the at least one electrode layer 10. The first and second tabs 12 and 14a, respectively, may be regions protruding outside of the at least one electrode layer 10 from an edge of the at least one electrode layer 10. The first tab 12 and the second tab 14a may be spaced apart from each other, and a gap between the first tab 12 and the second tab 14a is not limited. The first tab 12 may protrude outwards from an edge of the at least one electrode layer 10 and the second tab 14a may protrude outwards from the same edge of the at least one electrode layer 10. The second tab 14a may be disposed on, e.g., formed on, another edge different from the edge on which the first tab 12 is formed. However, the edge where the second tab 14a is disposed is not limited thereto, and the second tab may be disposed on any suitable edge of the electrode layer. The electrode stack structure may be formed by stacking a plurality of the electrode layers, and the second tab 14a of each of the electrode layers 10 having the same polarity may be electrically connected to each other.

Figure 1B:
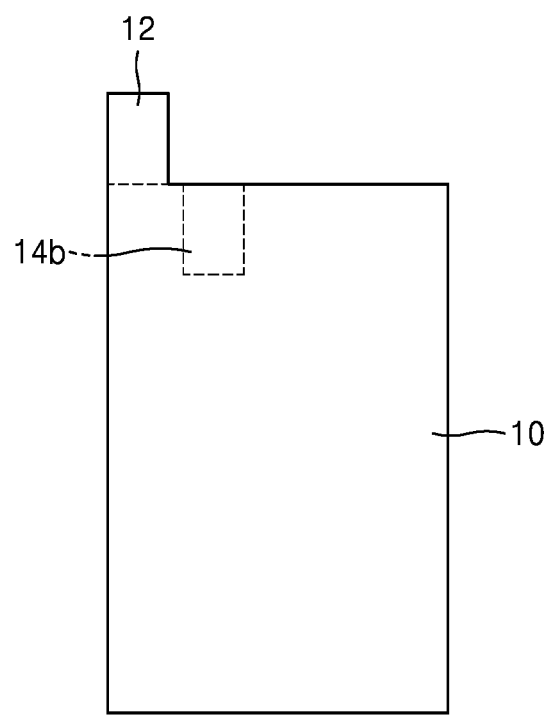
FIG. 1B is a schematic drawing of an electrode layer having multiple tabs.

In another exemplary embodiment shown in FIG. 1B, the at least one electrode layer 10 may include multiple tabs. The multiple tabs may include first and third tabs 12 and 14b, respectively. The first tab 12 may protrude outwards from an edge of the electrode layer 10. The third tab 14b may be formed on a side of the first tab 12 but the location of the third tab 14b is not limited thereto. When the third tab 14b and the second tab 14a of FIG. 1A are compared, the second tab 14a protrudes outwards from the electrode layer 10, like the first tab 12, and the third tab 14b may be defined by a region of the electrode layer where an electrode active material layer is not disposed on an electrode current collector of the electrode layer 10. The electrode layer 10 may be a polygonal shape, such as a rectangular shape, and the third tab 14b may be formed within the electrode layer 10. Here, the electrode layer 10 may have an electrode stack structure in which a plurality of electrode layers 10 is stacked, and the third tab 14b of each of the electrode layers 10 may be electrically connected to each other.

Figure 2A:
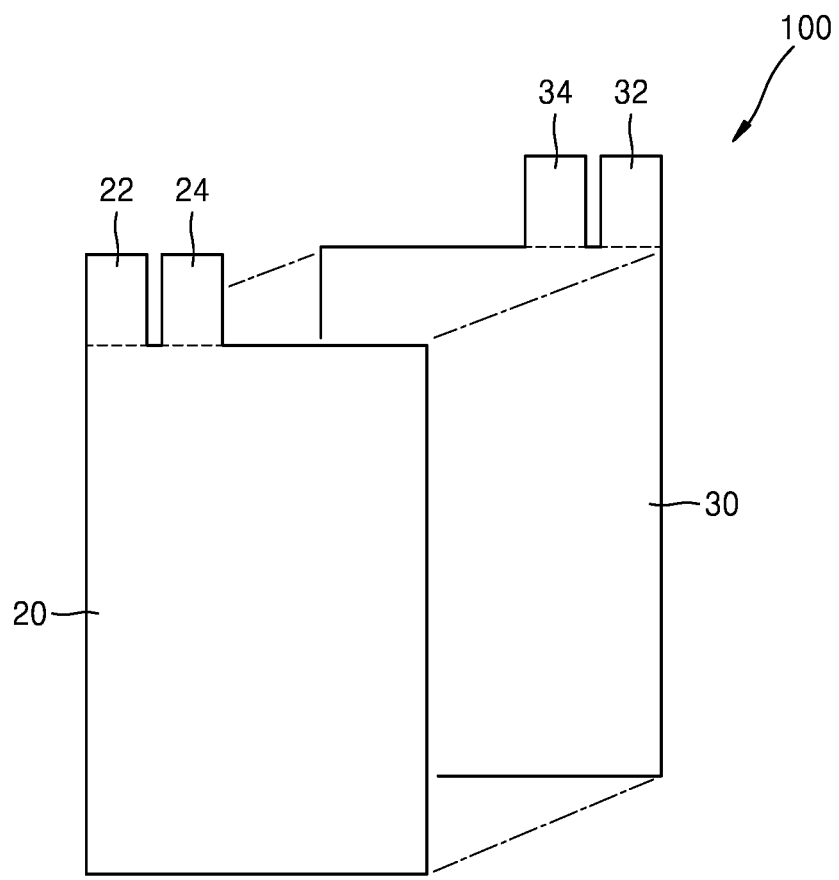
FIG. 2A is a schematic drawing of a cathode and an anode respectively having multiple tabs.

FIG. 2A is a schematic drawing of a cathode and an anode each having a set of multiple tabs, according to an exemplary embodiment. Referring to FIG. 2A, the battery 100 according to an exemplary embodiment may include a first electrode layer 20 and a second electrode layer 30. The first electrode layer 20 may be a cathode and the second electrode layer 30 may be an anode, for example. The first electrode layer 20 and the second electrode layer 30 may respectively include a first set of multiple tabs and a second set of multiple tabs. The first set of multiple tabs includes a first tab 22 and a second tab 24 that may be formed on an edge of the first electrode layer 20. The first set of multiple tabs, namely, the first tab 22 and the second tab 24, may protrude from an edge of the first electrode layer 20, and the second tab 24 may be formed within the first electrode layer 20. However, the location of the second tab 24 is not limited thereto. The second set of multiple tabs includes the first tab 32 and the second tab 34 that may be disposed on an edge of the second electrode layer 30. The second set of multiple tabs, namely, the first tab 32 and the second tab 34, may protrude from an edge of the second electrode layer 30, and the second tab 34 may be disposed within the second electrode layer 30. However, the location of the second tab 34 is not limited thereto.

Figure 2B:
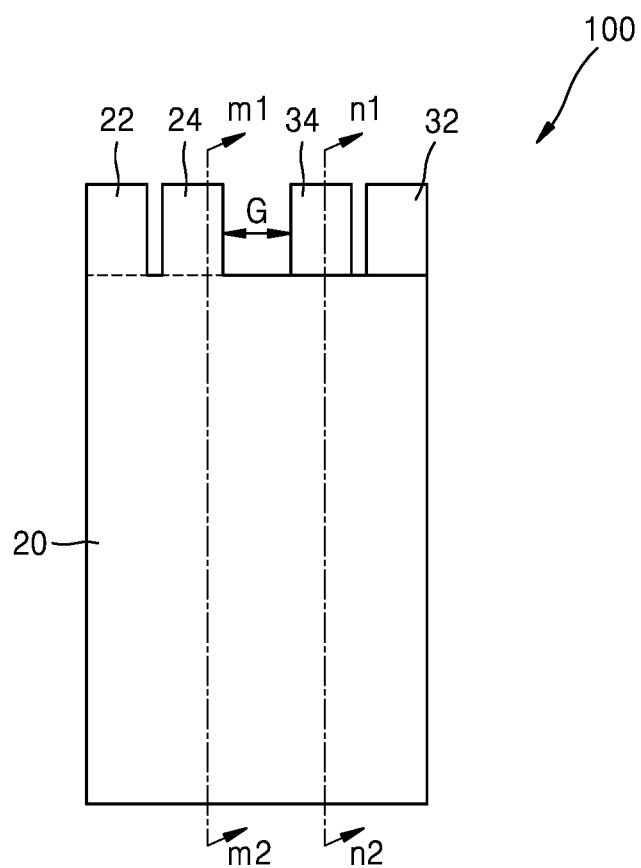
FIG. 2B is a schematic drawing of a battery having an electrode stack structure in which the cathode and the anode of FIG. 2A are combined.
Figure 3A:
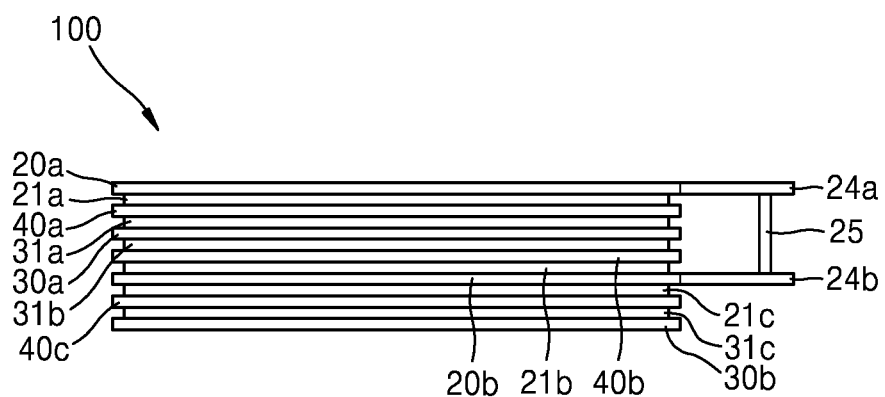
FIG. 3A is a cross-sectional view taken along line m1-m2 of FIG. 2B.

The first electrode layer 20 and the second electrode layer 30 may be disposed on one another to form a stack, and if desired may be folded. FIG. 2B is a schematic drawing of a battery having an electrode stack structure in which the first electrode layer 20, e.g., a cathode, and the second electrode layer 30, e.g., an anode of FIG. 2A, are combined to form a battery. Referring to FIGS. 2A and 2B, the first and second electrode layers 20 and 30 may be stacked or folded to provide a battery. For example, as shown in FIG. 3A, a first cathode comprising a first cathode current collector 20a and having a cathode active material layer disposed on a single side thereon may be disposed on a first anode comprising a first anode current collector 30a having an anode active material disposed on both sides thereon. The first anode may be disposed on a second cathode comprising a second cathode current collector 20b having the cathode active material layer disposed on both sides of the second cathode current collector 20b. The second cathode may be disposed on a second anode comprising a second anode current collector 30b having the anode active material disposed on a side of the second anode current collector which is proximate to the second cathode current collector 20b. At this point, the second tab 24 of the first electrode layer 20 and the second tab 34 of the second electrode layer 30 may be separated from each other and between the first tab 22 of the first electrode layer 20 and the first tab 32 of the second electrode layer 30 of the electrode stack structure. In a folded state of the first electrode layer 20 and the second electrode layer 30, a gap G as shown in FIG. 2B between the second tab 24 of the first electrode layer 20 and the second tab 34 of the second electrode layer 30 is not fixed, and the gap be selected have any suitable dimension.

The electrode stack structure having multiple tabs, according to an exemplary embodiment, may have a structure in which a plurality of electrode layers are stacked, and may have a structure in which the first electrode layer 20 and the second electrode layer 30 are alternately stacked. A separator may be formed between the first electrode layer 20 and the second electrode layer 30. For example, a battery having multiple tabs may be formed by consecutively stacking a structure comprising a first electrode layer 20/a separator/a second electrode layer 30/the separator/the first electrode layer 20/the separator/the second electrode layer 30. In this manner, a plurality of the first electrode layer 20 and a plurality the second electrode layer 30 may be stacked, and the second tabs 24 and 34 of the first and second electrode layers 20 and 30 having the same polarity may be electrically connected to each other, as is further disclosed below.

Figure 3B:
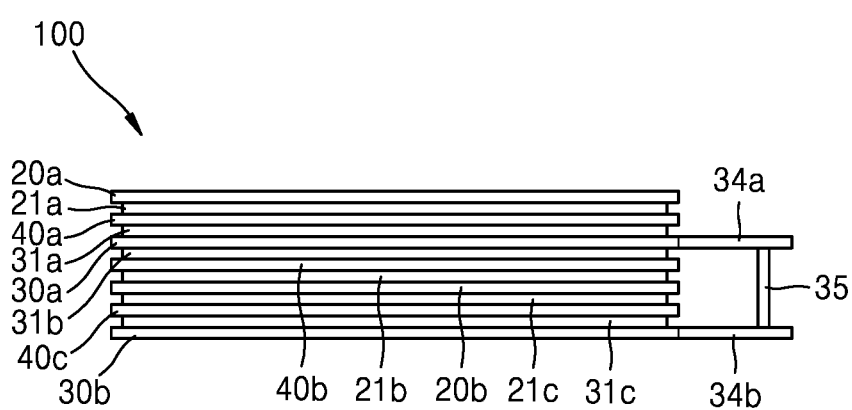
FIG. 3B is a cross-sectional view taken along line n1-n2 of FIG. 2B.

FIG. 3A is a cross-sectional view taken along line m1-m2 of FIG. 2B. FIG. 3B is a cross-sectional view taken along line n1-n2 of FIG. 2B.

Referring to FIGS. 2A, 2B, 3A, and 3B, the first electrode layer 20 may include at least one first metal current collector, e.g., a first and a second first-type metal current collector 20a and 20b, respectively, and first active material layers, e.g., first, second, and third first-type active material layers 21a, 21b, and 21c, respectively, disposed on at least a surface of the first-type metal current collectors 20a and 20b. Also, the second electrode layer 30 may include first, second, and third second active material layers 31a, 31b, and 31c, respectively, disposed on at least a surface of at least one of the first and second second metal current collectors 30a and 30b, respectively. A separator, namely, first, second, and third separators 40a, 40b, and 40c, respectively, may be disposed, e.g., formed, between respective first electrode layers and second electrode layers. The first active material layer 21a may be disposed on, e.g., formed on, a lower surface of the first first-type metal current collector 20a, and the first separator 40a may be disposed on a lower surface of the first first-type active material layer 21a. Also, the first second active material layer 31a may be disposed on a lower surface of the first separator 40a, and the second metal current collector 30a may be disposed on a lower surface of the first second active material layer 31a. The first second active material layer 31b may be disposed on a lower surface of the first second metal current collector 30a, and the second separator 40b may be disposed on a lower surface of the second second active material layer 31b. The second first active material layer 21b may be disposed on a lower surface of the second separator 40b, the second metal current collector 20b may be formed on a lower surface of the second active material layer 21b, and the first active material layer 21c may be formed on a lower surface of the second metal current collector 20b. The third separator 40c may be formed on a lower surface of the first active material layer 21c. The third second active material layer 31c may be disposed on a lower surface of the third separator 40c, and the second second metal current collector 30b may be disposed on a lower surface of the third second active material layer 31c.

More specifically, the first active material layer 21a may be disposed on a lower surface of metal current collector 20a, and separator 40a may be disposed on a lower surface of the first active material layer 21a. The second active material layer 31a may be disposed on a lower surface of separator 40a, and a metal current collector 30a may be disposed on a lower surface of the second active material layer 31a. The second active material layer 31b may be disposed on a lower surface of metal current collector 30a, and the separator 40b may be disposed on a lower surface of the second active material layer 31b. The first active material layer 21b may be disposed on a lower surface of the separator 40b, the metal current collector 20b may be disposed on a lower surface of the first active material layer 21b, and the first active material layer 21c may be disposed on a lower surface of the metal current collector 20b. The separator 40c may be disposed on a lower surface of the first active material layer 21c. The second active material layer 31c may be disposed on a lower surface of the third separator 40c, and the metal current collector 30b may be disposed on a lower surface of the second active material layer 31c.

The first tab 22 of the first electrode layer 20 may be formed to be protruding from the first metal current collectors 20a and 20b. The second tab 24 of the first electrode layer 20 may be formed to protrude from the first and second first metal current collectors 20a and 20b. A 2-1 tap 24a disposed from the first first metal current collector 20a and a 2-2 tap 24b disposed from the second first metal current collector 20b may be electrically connected to each other by a first connection unit 25.

The first tab 32 may protrude from the second electrode layer 30 and may protrude from the first and second second metal current collectors 30a and 30b, respectively. That is, the first tab 32 may be disposed on each of the first and second second metal current collectors 30a and 30b. Also, the second tab 34 of the second electrode layer 30 may protrude from the first and second second metal current collectors 30a and 30b. A 2-3 tap 34a disposed from the first second metal current collector 30a and a 2-4 tap 34b disposed from the second second metal current collector 30b may be electrically connected to each other by a second connection unit 35. The first connection unit 25 and the second connection unit 35 may include an electro-conductive material, such as a metal, an alloy, or a conductive polymer. The first connection unit 25 and the second connection unit 35 may be hinge unit including an electro-conductive material.

The first electrode layer 20 and the second electrode layer 30 may be one of a cathode film and an anode film, and the first electrode layer 20 may have a different polarity from the second electrode layer 30. When the first electrode layer 20 is a cathode film, the second electrode layer 30 may be an anode film. Also, when the first electrode layer 20 is an anode film, the second electrode layer 30 may be a cathode film. If the first electrode layer 20 is a cathode film, the first and second first metal current collectors 20a and 20b, respectively, may be cathode current collectors, and the first to third first active material layers 21a, 21b, and 21c, respectively, may be cathode active material layers. Also, if the second electrode layer 30 is an anode film, the first and second second metal current collectors 30a and 30b, respectively, may be anode current collectors, and the first to third second active material layers 31a, 31b, and 31c, respectively, may be anode active material layers.

The cathode current collector may comprise a metal selected from aluminum, stainless steel, titanium, copper, and silver, or a composite of metals selected from aluminum, stainless steel, titanium, copper, and silver. A combination comprising at least one of the foregoing may be used. The cathode active material layer may include a cathode active material, a binder, and a conductive material.

The cathode active material layer may include at least one material that reversibly absorbs or discharges lithium ions. For example, the cathode active material may include at least one of a lithium-transition metal oxide, nickel sulfide, copper sulfide, sulfur, iron oxide, and vanadium oxide. The lithium-transition metal oxide may include lithium cobalt oxide, lithium nickel oxide, lithium nickel-cobalt oxide, lithium nickel-cobalt-aluminum oxide, lithium nickel-cobalt-manganese oxide, lithium manganese oxide, and lithium iron phosphate.

The binder may include at least one of a polyvinylidene fluoride group-containing binder, such as polyvinylidene fluoride, vinylidene fluoride/hexafluoropropylene co-polymer, and vinylidene fluoride/tetrafluoroethylene co-polymer; a carboxymethylcellulose group-containing binder, such as sodium carboxymethylcellulose and lithium carboxymethylcellulose; a (meth)acryl group binder, such as polyacrylic acid, lithium polyacrylic acid, polyacrylonitrile, polymethyl methacrylate, and polybutyl acrylate; and a rubbery group-containing polymer, such as polyamideimide, polytetrafluoroethylene, polyethyleneoxide, polypyrrole, lithium tetrafluoroethylene sulfonate (Nafion), and styrene-butadiene. As used herein, a "(meth)acryl" group includes an acrylic acid group or salt thereof, methacrylic acid group or salt thereof, (C1 to C12 alkyl) acrylate group, (C1 to C12 alkyl) acrylate group, acrylonitrile group, and methacrylonitrile group.

The conductive material may include at least one of: a carbon group conductive material, such as carbon black, carbon fiber, and graphite; a conductive fiber, such as a metal fiber; a metal powder, such as carbon fluoride powder, aluminum powder, and nickel powder; a conductive whisker, such as zinc oxide and potassium titanate; a conductive metal oxide, such as titanium oxide; and a conductive polymer, such as polyphenylene derivatives.

The anode current collector may be a metal including copper, stainless steel, nickel, aluminum, and titanium. The anode active material layer may include an anode active material, a binder, and a conductive material.

The anode active material layer may include a material that may form an alloy with lithium or may reversibly absorb or discharge lithium ions. For example, the anode active material may include at least one of a metal, a carbon group material, a metal oxide, and a lithium metal nitride. The metal may include at least one of lithium, silicon, magnesium, calcium, aluminum, germanium, tin, lead, arsenic, antimony, bismuth, silver, gold, zinc, cadmium, mercury, copper, iron, nickel, cobalt, and indium. The carbon group material may include at least one of graphite, graphite carbon fiber, coke, mesophase carbon microbeads (MCMB), polyacenic, pitch group carbon fiber, and hard carbon. The metal oxide may include at least one of lithium titanium oxide, titanium oxide, molybdenum oxide, niobium oxide, iron oxide, tungsten oxide, tin oxide, amorphous tin composite oxide, silicon mono-oxide, cobalt oxide, and nickel oxide. The binder and the conductive material may be the same binder and conductive material included in the cathode active material layer.

The cathode film and the anode film may be formed by coating an active material layer on the metal current collector by using various coating methods. The method of coating the electrode active material layer is not specifically limited.

The first and second tabs 22 and 24, respectively, which may be disposed on the first electrode layer 20 and may include the same material used to form the first and second first metal current collectors 20a and 20b, respectively, and the first and second tabs 32 and 34, respectively, disposed on the second electrode layer 30 may include the same material used to form the first and second second metal current collectors 30a and 30b. The first and second tabs 22 and 24 may be substantially formed together with the process of forming the first and second metal current collectors 20a and 20b, and the first and second tabs 32 and 34 may be substantially formed together with the process of forming the first and second metal current collectors 30a and 30b. The third tab 14b depicted in FIG. 1B may be formed by not coating the electrode material layer on a region of the metal current collector.

The first through third separators 40a, 40b, and 40c may be formed as independent films or may be formed by locating non-conductive porous films on the first electrode layer 20 or the second electrode layer 30. The first through third separators 40a, 40b, and 40c may electrically separate the first electrode layer 20 and the second electrode layer 30, and the shape of the first through third separators 40a, 40b, and 40c may not be the same as that of the first electrode layer 20 or the second electrode layer 30. The first through third separators 40a, 40b, and 40c, respectively, may be porous polymer films, such as a polyethylene film or a polypropylene film, may be a fabric type or a non-fabric type having a polymer fiber, may include ceramic particles, and may include polymer solid electrolyte.

FIG. 4 is a schematic drawing of the battery 100 having a tab connected to a lead according to an exemplary embodiment. Referring to FIG. 4, the first tab 22 which is at least one of the first multiple-tab of the battery 100 according to the exemplary embodiment may be connected to a first lead 26. The first tab 22 and the first lead 26 may be connected to each other by welding at a first joining unit 23. The first joining unit 23 may be an overlapping region formed by extending the first tab 22 and the first lead 26 towards each other. Another member, for example, a fixing unit that is fixed on a housing that surrounds the battery 100 may be disposed on a region of the first lead 26. The first tab 32, which is one of the second multiple tab, may be connected to a second lead 36. The first tab 32 of the second multiple tab 32 and 34 and the second lead 36 may be connected to each other by welding at a second joining unit 33. The second joining unit 33 may be an overlapping region formed by extending the first tab 32 of the second multiple tab and the second lead 36 towards each other. A fixing unit to be fixed on another member may be disposed on a region of the second lead 36.

Figure 5A:
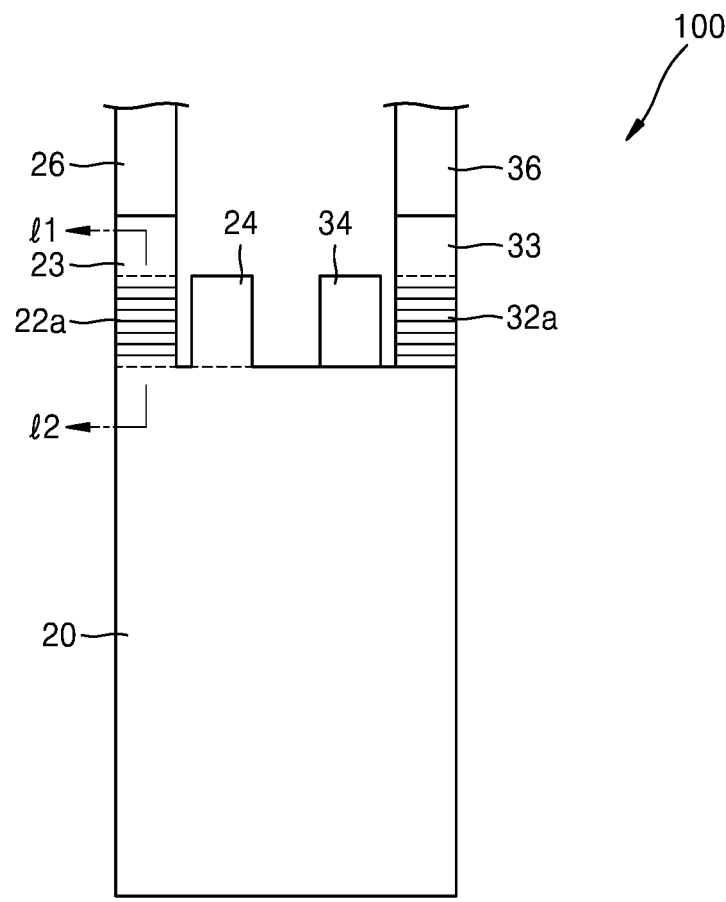
FIG. 5A is a schematic drawing of a battery having an electrode tab formed as a multiple-fold type structure.
Figure 5B:
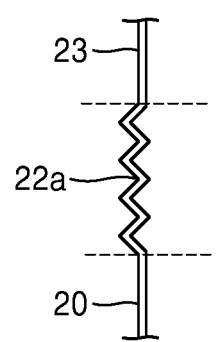
FIG. 5B is a cross-sectional view taken along line l1-l2 of FIG. 5A.

FIG. 5A is a schematic drawing of a battery having an electrode tap formed as a multiple-fold type structure. FIG. 5B is a cross-sectional view taken along line 11-12 of FIG. 5A.

Referring to FIG. 5A, a first tab 22a of a first multiple-tab is connected to the first lead 26, and a first tab 32a of a second multiple tab is connected to the second lead 36 of the battery 100. The foregoing structure may comprise multiple folds. Referring to FIG. 5B, since the first tab 22a of the first multiple tab between the first electrode layer 20 and the first joining unit 23 comprises multiple folds, when the battery 100 is used, a short circuit due to stress that may occur in a region of the electrode stack structure, or performance reduction may be prevented. More specifically, when the battery 100 according to the exemplary embodiment is used, stress may concentrate on the first and second joining units 23 and 33, respectively, and on the first tabs 22a and 32a. More specifically, when the battery 100 according to the exemplary embodiment is used, the electrode stack structure of the battery 100 may bend due to external physical forces, and thus, stress may concentrate on a portion of the electrode stack structure. In particular, due to the stress concentration and accumulated fatigue on the first and second joining units 23 and 33 and on the first tabs 22a and 32a, a short circuit may occur or the performance of the battery 100 may be reduced. Thus, the durability of the first and second first tabs 22a and 32a may be increased by forming the first and second first tabs 22a and 32a to comprise multiple folds.

Figure 6:
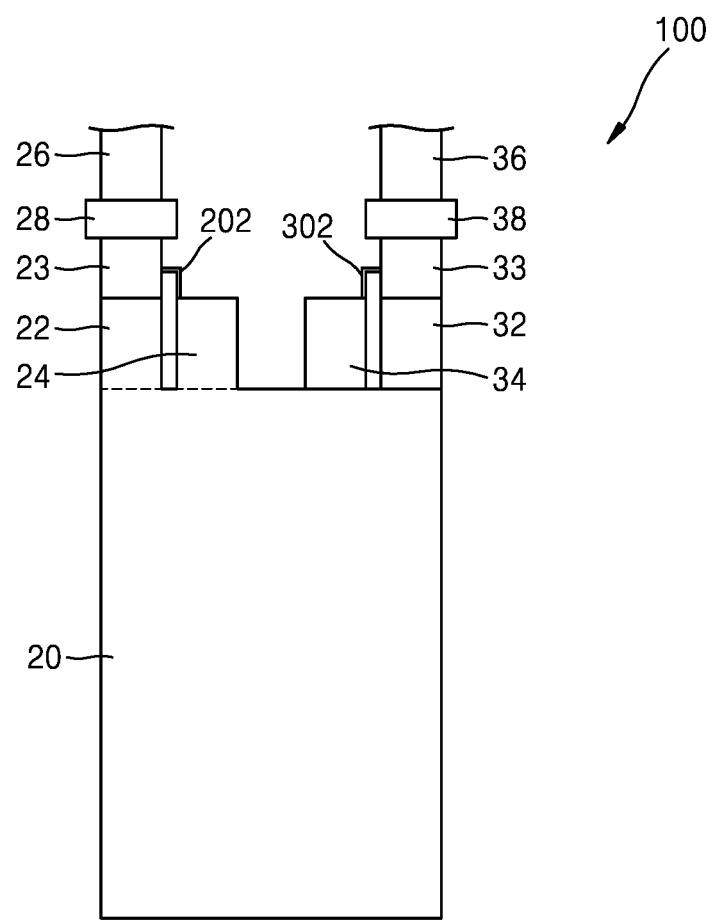
FIG. 6 is a schematic drawing of a structure in which a second tab and a lead of a battery having a multiple tabs are connected to each other by an electrode line.

FIG. 6 is a schematic drawing of a structure in which the second tab 24 and the lead 26 of the battery 100 having the first multiple tab are connected to each other by an electrode line, according to an exemplary embodiment.

Referring to FIG. 6, the first tab 22 of the first multiple tab of the battery 100 may be connected to the first lead 26, and the first tab 32 of the second multiple tab may be connected to the second lead 36. The second tab 24 of the first multiple tab and the first lead 26 may be electrically connected to each other by a first electrode line 202. The second tab 34 of the second multiple tab and the second lead 36 may be electrically connected to each other by a second electrode line 302. In FIG. 6, the first electrode line 202 connects the second tab 24 to the first joining unit 23, but the first joining unit 23 may be an overlapping region formed by extending the first tab 22 and the first lead 26 towards each other. The first electrode line 202 may be directly connected to the first lead 26. The same may be applied to the second electrode line 302. Fixing units 28 and 38, for fixing the first and second lead taps 26 and 36, respectively, on another member, such as a housing or a cover, may be disposed on a region of each of the first and second leads 26 and 36, respectively.

When the battery 100 according to the exemplary embodiment is used, a short circuit may occur between the first tab 22 of the first multiple tab and the first lead 26 and between the first tab 32 of the second multiple tab and the second lead 36. Since the first and second electrode lines 202 and 302, respectively are present, even though a short circuit occurs between the first tabs 22 and 32 and the first and second lead 26 and 36, a current flow between the electrode stack structure and the first and second leads 26 and 36 of the battery 100 may be maintained. The battery 100 according to the exemplary embodiment may have a double by-pass structure by including the first and second electrode lines 202 and 302, respectively, and thus an operational stability may be improved. As depicted in FIGS. 3A and 3B, the first and second second tabs 24a and 24b of the first electrode layer 20 of the battery 100 may be electrically connected to each other, and the first and second second tabs 34a and 34b of the second electrode layer 30 may also be electrically connected to each other. Accordingly, in the case when the first and second electrode lines 202 and 302, respectively, are present, even though a short circuit occurs between the first tabs 22 and 32 and the first and second leads 26 and 36, respectively, the first and second leads 26 and 36 may be respectively connected to the first electrode layer 20 and the second electrode layer 30 through the first and second electrode lines 202 and 302, respectively.

Figure 7:
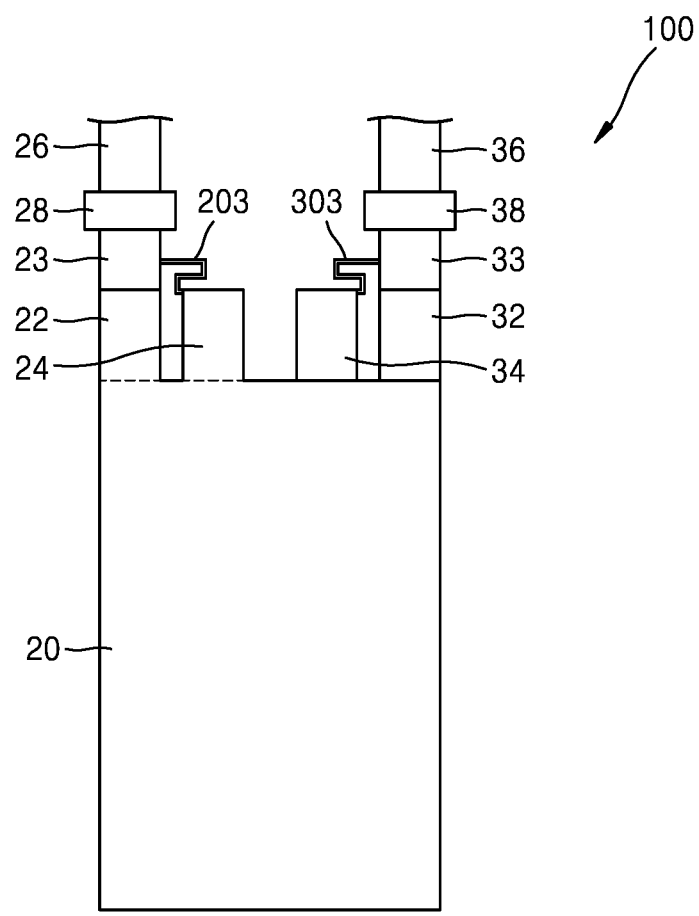
FIG. 7 is a schematic drawing of a structure in which electrode lines that connect a second tab and a lead are connected in the battery having multiple tabs.

FIG. 7 is a schematic drawing of a structure in which electrode lines that connect a second tab and a lead are connected in the battery 100 having multiple tabs according to an exemplary embodiment.

Referring to FIG. 7, the second tab 24 of the first multiple tab and the first lead 26 are electrically connected to each other by a first electrode line 203. The second tab 34 of the second multiple tab and the second lead 36 may be electrically connected to each other by a second electrode line 303. The first and second electrode lines 203 and 303 may have various shapes. The first and second electrode lines 203 and 303 may each independently be linear or curved, and may have a bent shape, a winding shape, or a straight line shape, so that the first and second electrode lines 203 and 303 are not easily disconnected by an external physical force when the battery 100 is used. For example, the first electrode line 203 or the second electrode line 303 may be formed to have a multiple folds, e.g., a zigzag shape.

Figure 8:
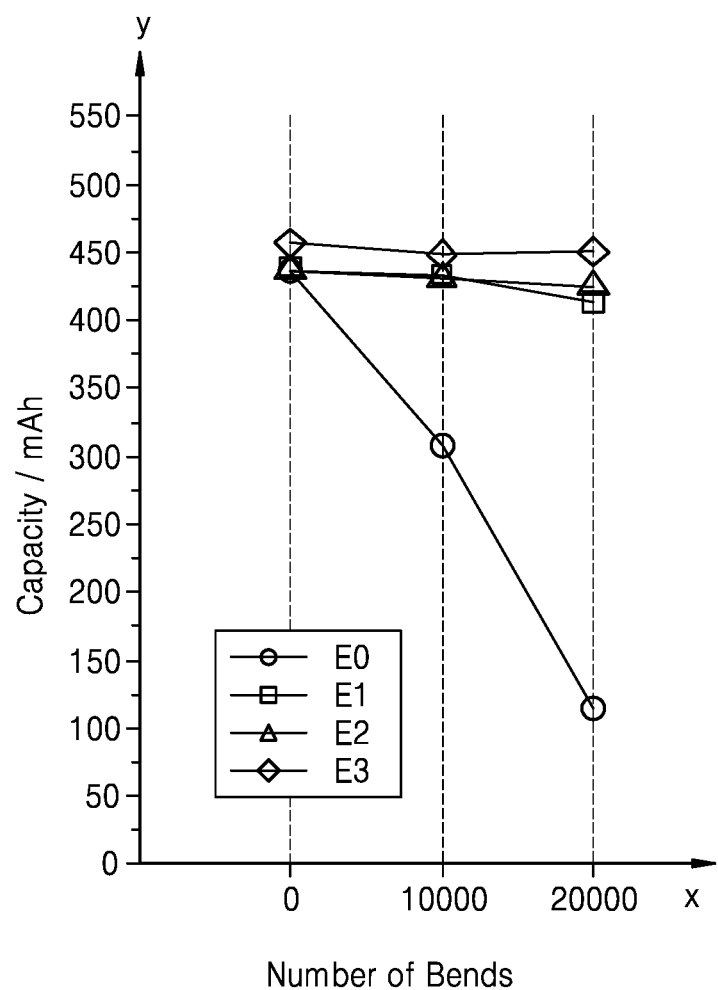
FIG. 8 is a graph of capacity (milliampere-hours, mAh) versus number of bends showing the results of a bending test of a battery.

FIG. 8 is a graph showing the results of a bending test of a battery according to another exemplary embodiment. Here, E0 indicates a battery having a single tab structure connected to a lead without including a multiple tab, E1 indicates a battery having the structure of FIG. 5A, E2 indicates a battery having the structure of FIG. 6, and E3 indicates a battery having the structure of FIG. 7. Cathodes of each of the batteries E0 through E3 include four sheets of cathode current collectors formed of lithium-cobalt oxide, and anodes of each of the batteries E0 through E3 include four sheets of anode current collectors formed of graphite. After performing bending operations of 20,000 times to each of the batteries E0 through E3, capacities are measured. Referring to FIG. 8, in the case of the batteries E1 through E3, the capacity changes after bending of 20,000 times are small. However, in the case of the battery E0 having a single tab structure, as the bending operations are repeated, the capacity reduction is large.

According to the current exemplary embodiment, an electrode stack structure in which electrode layers are formed to comprise a multiple tab structure and a battery having the electrode stack structure may be provided. The stability of the battery may be maintained by forming a portion of the multiple tab connected to a lead to a multi-folding structure. The other portion of the multiple tab that is not directly connected to the lead may be electrically connected to the lead through an electrode line, and thus, the battery may have improved stability. The electrode stack structure may be manufactured by a method comprising: stacking a plurality of electrode layers comprising electrode layers having multiple tabs, wherein the multiple tabs each comprise a first tab and a second tab which is spaced apart from the first tab; connecting a first tab of a first multiple tab to a lead; and connecting second tabs of electrode layers having a same polarity to each other to manufacture the electrode stack structure.

In this manner, in the case of a battery according to an exemplary embodiment, each of the electrode layers comprise a multiple tab structure, and the electrode layers are electrically connected to leads by additional detour circuits, and thus, even after a number of bending operations, the battery may have a stable operation. The battery according to the exemplary embodiment may be applied to provide a flexible secondary battery, and also, may be applied to provide a non-flexible battery.

While one or more exemplary embodiments have been described with reference to the figures, it will be understood by those of ordinary skill in the art that various changes in form and details may be made therein without departing from the spirit and scope as defined by the following claims.

What is claimed is:

1. An electrode stack structure comprising:
   a plurality of first electrode layers, each first electrode layer having a first polarity;
   a plurality of second electrode layers, each second electrode layer having a second polarity, which is different than the first polarity, wherein the first electrode layers and the second electrode layers are alternately disposed; and
   a separator, which is disposed between each first electrode layer and second electrode layer,
   wherein the first electrode layers and the second electrode layers have multiple tabs comprising a first tab and a second tab that is spaced apart from the first tab,
   wherein the first tabs of the first electrode layers are connected to a first lead, and
   wherein the second tabs of the first electrode layers are electrically connected to each other by a first connection unit which is different from the first lead, and
   wherein the first tabs of the second electrode layers are connected to a second lead, and
   wherein the second tabs of the second electrode layers are electrically connected to each other by a second connection unit which is different from the second lead,
   the electrode stack structure further comprising
      a first electrode line that electrically connects the first lead with at least one second tab of the first electrode layers and has a width smaller than the width of the first lead, wherein an end of the first electrode line is connected to the first lead and spaced from the first tabs of the first electrode layers; and
      a second electrode line that electrically connects the second lead with at least one second tab of the second electrode layers and has a width smaller than the width of the second lead, wherein an end of the second electrode line is connected to the second lead and spaced from the first tabs of the second electrode layers.

2. The electrode stack structure of claim 1, wherein the first tabs of the first electrode layers and the first tabs of the second electrode layers comprise multiple folds.

3. The electrode stack structure of claim 1, wherein the first connection unit or the second connection unit each independently comprise an electrically conductive material.

4. The electrode stack structure of claim 1, wherein the first electrode line, the second electrode line, or both comprise a multiple tab having a fold or a bend.

5. The electrode stack structure of claim 1, wherein the first electrode line, the second electrode line, or both comprise a multiple-tab having a multiple folds.

6. The electrode stack structure of claim 1, further comprising a joining unit formed by overlapping the first tabs of the first electrode layers and the first lead, which is disposed between the first tabs of the first electrode layers and the first lead, or
   overlapping the first tabs of the second electrode layers and the second lead, which is disposed between the first tabs of the second electrode layers and the second lead.

7. The electrode stack structure of claim 1,
wherein the first electrode layers comprise first metal current collectors and a first active material layer which is disposed on a surface of the first metal current collectors, and
wherein the first tabs of the first electrode layers and the second tabs of the first electrode layers protrude from the first metal current collectors, and
wherein the second electrode layers comprise second metal current collectors and a second active material layer which is disposed on a surface of the second metal current collectors, and
wherein the first tabs of the second electrode layers and the second tabs of the second electrode layers protrude from the second metal current collector.

8. The electrode stack structure of claim 1,
wherein the first electrode layers comprise first metal current collectors and a first active material layer disposed on a surface of the first metal current collectors,
wherein the first tabs of the first electrode layers protrude from the first metal current collectors,
wherein the second tabs of the first electrode layers are disposed on a region of the metal current collector where the active material layer is not disposed,
wherein the second electrode layers comprise second metal current collectors and a second active material layer disposed on a surface of the second metal current collectors,
wherein the first tabs of the second electrode layers protrude from the second metal current collectors, and
wherein the second tabs of the second electrode layers are disposed on a region of the second metal current collectors where the active material layer is not disposed.

9. A battery comprising the electrode stack structure of claim 1.

10. A method of manufacturing an electrode stack structure, the method comprising:
stacking a plurality of electrode layers comprising first electrode layers and second electrode layers;
connecting first tabs of first electrode layers to a first lead;
connecting first tabs of second electrode layers to a second lead;
connecting second tabs of the first electrode layers by a first connection unit which is different from the first lead;
connecting second tabs of the second electrode layers by a second connection unit which is different from the second lead;
connecting at least one second tab of the first electrode layers with the first lead by a first electrode line which has a width smaller than the width of the first lead, wherein an end of the first electrode line is connected to the first lead and spaced from the first tabs of the first electrode layers; and
connecting at least one second tab of the second electrode layers with the second lead by a second electrode line which has a width smaller than the width of the second lead, wherein an end of the second electrode line is connected to the second lead and spaced from the first tabs of the second electrode layers, to manufacture the electrode stack structure.

* * * * *